Nov. 16, 1926. 1,607,341
A. CROST
TIRE SPREADER
Filed May 8, 1926
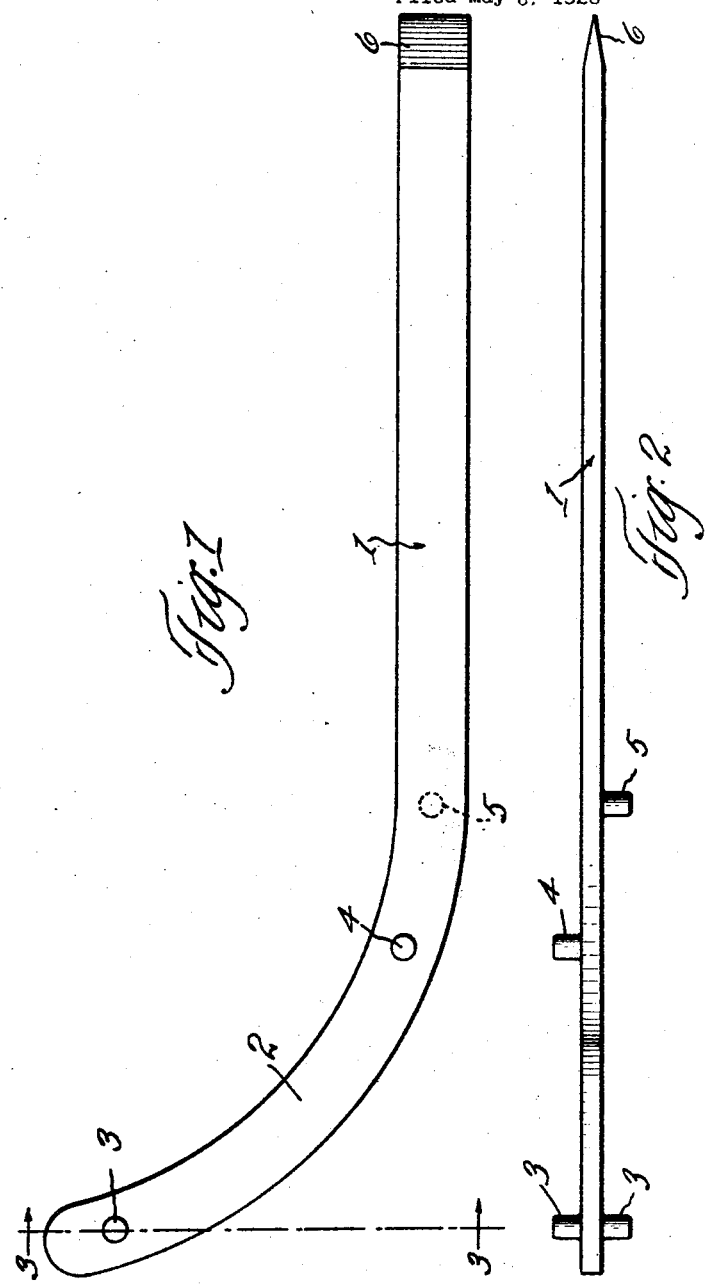
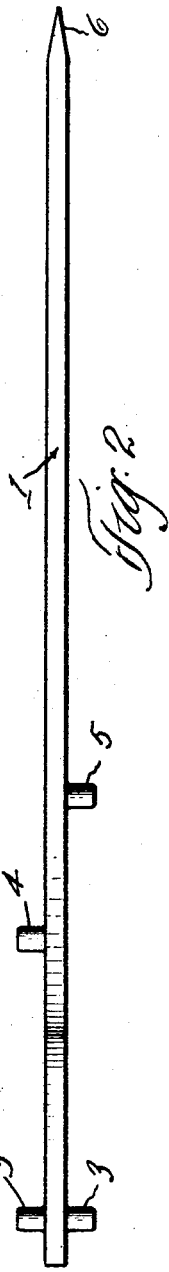
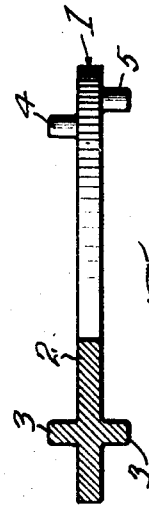
INVENTOR.
Albert Crost
BY Hull Broch & West
Attys.

Patented Nov. 16, 1926.

1,607,341

UNITED STATES PATENT OFFICE.

ALBERT CROST, OF CLEVELAND HEIGHTS, OHIO.

TIRE SPREADER.

Application filed May 8, 1926. Serial No. 107,596.

This invention relates to an improved tire spreader and has for one of its objects to provide a device of the character described whereby the sides of a pneumatic tire casing may be readily spread apart so as to give access to the interior of the casing.

Another object of the invention is to provide a device which may be readily positioned along the beads of a tire casing and then operated to spread the sides of the casing apart as desired.

Another object of the invention is to provide a device of the character described which may be cast in one piece and which is well adapted for quantity production at comparatively low cost.

Another object of the invention is to provide a tire spreader in which the width of the spread may be changed by merely turning the tool over.

Further and more limited objects of the invention will appear as the description proceeds and by reference to the accompanying drawing in which Fig. 1 is a top plan view of a tire spreader constructed in accordance with my invention with the same laid on its side; Fig. 2 is a view similar to Fig. 1 with the tire spreader laid on its edge; and Fig. 3 is a sectional view on the line 3—3 of Fig. 1.

In carrying out my invention I employ a metal shank 1 which is provided with a laterally directed inner end portion or arm 2. This arm is longitudinally curved to conform more or less to the inner circumference of a tire casing. Formed on the inner curved end portion 2 are a pair of oppositely disposed posts 3 projecting outwardly therefrom at substantially right angles thereto. Formed on one side of the metal shank 1 is a post 4 spaced from said first post and projecting only from one side thereof. A third post 5 is formed on said shank and projects from the opposite side thereof. The post 5 is spaced from said first pair of posts a greater distance than the post 4 whereby to adapt the device for spreading tire casings of different sizes as will hereinafter appear.

As is well known, the large sized tire casings are very stiff, this being particularly true of truck tire casings, and when repairing such a casing it has heretofore proven extremely difficult and laborious to spread the sides of the casing in order to gain access to the interior thereof. In a great many instances this operation is indispensable and the present invention seeks to provide a device whereby the sides of the casing may be easily flexed apart. Initially the arm 2 is disposed over the slot between the beads of the casing and one of the posts 3 and either the post 4 or the post 5 will project through the slot depending upon which side of the shank is next to the casing. The shank 1 may now be swung transversely with respect to the tire whereupon the post 3 will engage one bead of the casing and the post 4 will engage the opposite bead and effect a spreading of the sides of the tire.

The posts 3, 4 and 5 are preferably cast integral with the shank but if desired the same may be detachably secured thereto. One end of the tool is tapered as shown at 6 whereby the device may be used as a usual tire iron for removing a tire from its rim.

It will now be clear that when the device is placed on a tire casing that the casing will be spread apart a distance equal to the distance between the lugs or posts 3 and 4 and that when the device is turned over on the opposite side the casing will be spread apart a distance equal to the distance between the posts 3 and 5.

It will now be clear that I have provided a device which will accomplish the objects of the invention as hereinbefore stated.

Having thus described my invention, what I claim is:—

1. A tire spreader comprising a flat member having one end curved and the opposite extended to provide a handle, a pair of posts secured to said member adjacent said curved end and projecting from opposite sides thereof and adapted to be inserted between the beads of a tire casing, a third post secured to said member and projecting from one side of said member and spaced from said pair of posts, a fourth post secured to said member and projecting from the opposite side thereof, said last mentioned post being positioned between said third post and said pair of posts whereby to adapt said spreader for spreading different size tires.

2. A tire spreader comprising a flat member curved at one end, a pair of posts on said member adjacent said curved end projecting from opposite sides thereof at substantially right angles thereto and adapted to be positioned between the beads of a tire casing, a third post spaced from said pair of posts and projecting only from one side of said member, a fourth post on said member projecting from the opposite side of said member, said last mentioned post being secured between said pair of posts and said third post whereby said spreader is adapted for spreading different size tires.

3. A tire spreader comprising a flat member curved at one end and having a pair of posts adjacent said curved end projecting from opposite sides thereof and adapted to be inserted between the beads of a tire casing, a third post on said member spaced from said pair of posts and projecting from one side of said member, a fourth post on said member spaced from said pair of posts a greater distance than said third post and projecting from the opposite side of said member whereby to adapt said tire spreader for spreading different size casings.

4. A device as set forth in claim 3 in which all of said posts are cast integral with said flat member.

In testimony whereof, I hereunto affix my signature.

ALBERT CROST.